United States Patent [19]

Nishimura

[11] 4,361,850
[45] Nov. 30, 1982

[54] COLOR TELEVISION RECEIVER WITH CHARACTER DISPLAY FUNCTION

[75] Inventor: Yoshinori Nishimura, Daito, Japan

[73] Assignee: Sanyo Electric Co., Ltd., Moriguchi, Japan

[21] Appl. No.: 193,942

[22] PCT Filed: Jul. 12, 1979

[86] PCT No.: PCT/JP79/00184

§ 371 Date: Mar. 13, 1980

§ 102(e) Date: Dec. 11, 1979

[87] PCT Pub. No.: WO80/00292

PCT Pub. Date: Feb. 21, 1980

[30] Foreign Application Priority Data

Jul. 13, 1978 [JP] Japan .................................. 53-86494

[51] Int. Cl.³ .......................... H04N 9/535; H04N 9/20
[52] U.S. Cl. ...................................... 358/65; 340/701;
340/793; 340/723; 358/27; 358/147
[58] Field of Search .................... 358/22, 27, 29, 65,
358/74, 81, 82, 142, 146, 147; 340/701, 703,
812, 793

[56] References Cited

FOREIGN PATENT DOCUMENTS 2803746 10/1978 Fed. Rep. of Germany ...... 340/701
51-8530 3/1976 Japan .
51-20134 6/1976 Japan .

*Primary Examiner*—John C. Martin
*Attorney, Agent, or Firm*—Armstrong, Nikaido, Marmelstein & Kubovcik

[57] ABSTRACT

A color television receiver has a decoder for producing red, green and blue driving currents which are applied to red, green and blue control circuits, respectively, for combining these three colors to establish one of seven colors on a screen of a cathode ray tube in accordance with a received signal. A current divider is connected between the decoder and each of the red, green and blue control circuits for dividing each of the driving currents into a plurality of current components having different levels. The current components are combined with each other in a combination defined by the received signal for producing a predetermined level of color driving current so that all the colors can be reproduced with a predetermined level of brightness.

6 Claims, 4 Drawing Figures

Fig. 2

| ORIGINAL DRIVING CURRENT | GENERATED DRIVING CURRENT | | | RED | | | GREEN | | | BLUE | | |
|---|---|---|---|---|---|---|---|---|---|---|---|---|
| RED | GREEN | BLUE | 2a | 2b | 2c | 3d | 3e | 3f | 4g | 4h | 4i |
| BLUE | ○ | ○ | ○ | ○ | ○ | ○ | ○ | ○ | ○ | ○ | ○ | ○ |
| GREEN | ○ | ○ | — | ○ | ○ | ○ | ○ | ○ | ○ | — | ○ | — |
| CYAN | ○ | — | ○ | ○ | ○ | ○ | — | ○ | — | ○ | ○ | ○ |
| RED | ○ | — | — | ○ | ○ | ○ | — | — | ○ | — | — | ○ |
| MAGENTA | — | ○ | ○ | — | ○ | — | ○ | ○ | ○ | ○ | ○ | ○ |
| YELLOW | — | ○ | — | — | — | ○ | ○ | ○ | ○ | — | — | ○ |
| WHITE | — | — | ○ | — | — | ○ | — | — | ○ | ○ | ○ | ○ |
| WHITE | — | — | — | — | ○ | ○ | — | ○ | ○ | — | ○ | ○ |

COLOR TELEVISION RECEIVER WITH CHARACTER DISPLAY FUNCTION

TECHNICAL FIELD

The present invention relates to a color television receiver and, more particularly, to a current driver for use in association with a Teletext decoder designed for the Teletext system.

BACKGROUND ART

The Teletext system is an information broadcasting system in which Pages of text and graphical symbols are transmitted in coded form on otherwise unused television lines during the field interval. The decoded Pages are intended to be displayed in place of, or added to, the television picture. Newsflashes and Subtitles may be inset in the picture. According to the Teletext system as presented by the BBC's CEEFAX or IBA's ORACLE service, one of the otherwise unused lines of the television field-blanking interval is used to carry information for one Teletext Character Row. Such a line is referred to as Data-line.

At least one of the seven colors, white, yellow, cyan, green, magenta, red and blue, is used to depict the display character in the character rectangle. The background color which is filling the parts of the character rectangle not occupied by the character itself may be blank or any one of the seven display colors.

In displaying the pages, the operator may select a combination of colors for the display character and the background. Since the colors are established through a so-called additive color mixing system, the total driving current for every color is not the same. Therefore, in some color combinations, the brightness of the background results much brighter than the same of the display character, and vice versa, and, in such cases, it is difficult to distinguish the display character over the background.

Table 1 shows a driving current distribution for each of the seven colors.

TABLE 1

| Color on the screen | Red driving current | Green driving current | Blue driving current | Total driving current |
|---|---|---|---|---|
| White | 2 | 2 | 2 | 6 |
| Red | 2 | | | 2 |
| Green | | 2 | | 2 |
| Blue | | | 2 | 2 |
| Yellow | 2 | 2 | | 4 |
| Magenta | 2 | | 2 | 4 |
| Cyan | | 2 | 2 | 4 |

In Table 1, the values in each row do not present the actual operating value, but merely shows the ratio of three driving currents. For example, white on the screen is established when the red driving current, green driving current and blue driving current are combined in a ratio of 2:2:2. Therefore, the total driving current for white amounts to 6. In another example, red on the screen is established when the red, green and blue driving currents are combined in a ratio of 2:0:0. Therefore, the total driving current for red amounts to 2. In the above examples, it would be quite difficult to distinguish red characters from the white background.

DISCLOSURE OF INVENTION

Accordingly, a primary object of the present invention is to provide a current driver for balancing the driving currents to render the total driving currents of all the colors to be approximately the same level.

In accomplishing this and other objects, a color television receiver has a decoder for producing red, green and blue driving currents in binary form in accordance with a received signal. The red, green and blue driving currents are applied to red, green and blue control circuits, respectively, for combining the red, green and blue colors on a screen of a cathode-ray tube in a combination defined by the received signal and for establishing one of a plurality of colors on the screen. The color television receiver according to the present invention is characterized in that a current driver is connected between the decoder and each of the red, green and blue control circuits for generating driving currents in a plurality of current components having different levels. The current components in one color driving current are combined with each other in a combination defined by the received signal for producing a predetermined level of color driving current, whereby the total current used for establishing each of the plurality of colors has the same level with each other.

BRIEF DESCRIPTION OF INVENTION

FIG. 2 is a table showing the relation between the input and output signals of a logic circuit employed in the current driver shown in FIG. 1;

BEST MODE FOR CARRYING OUT THE INVENTION

Figure 1:
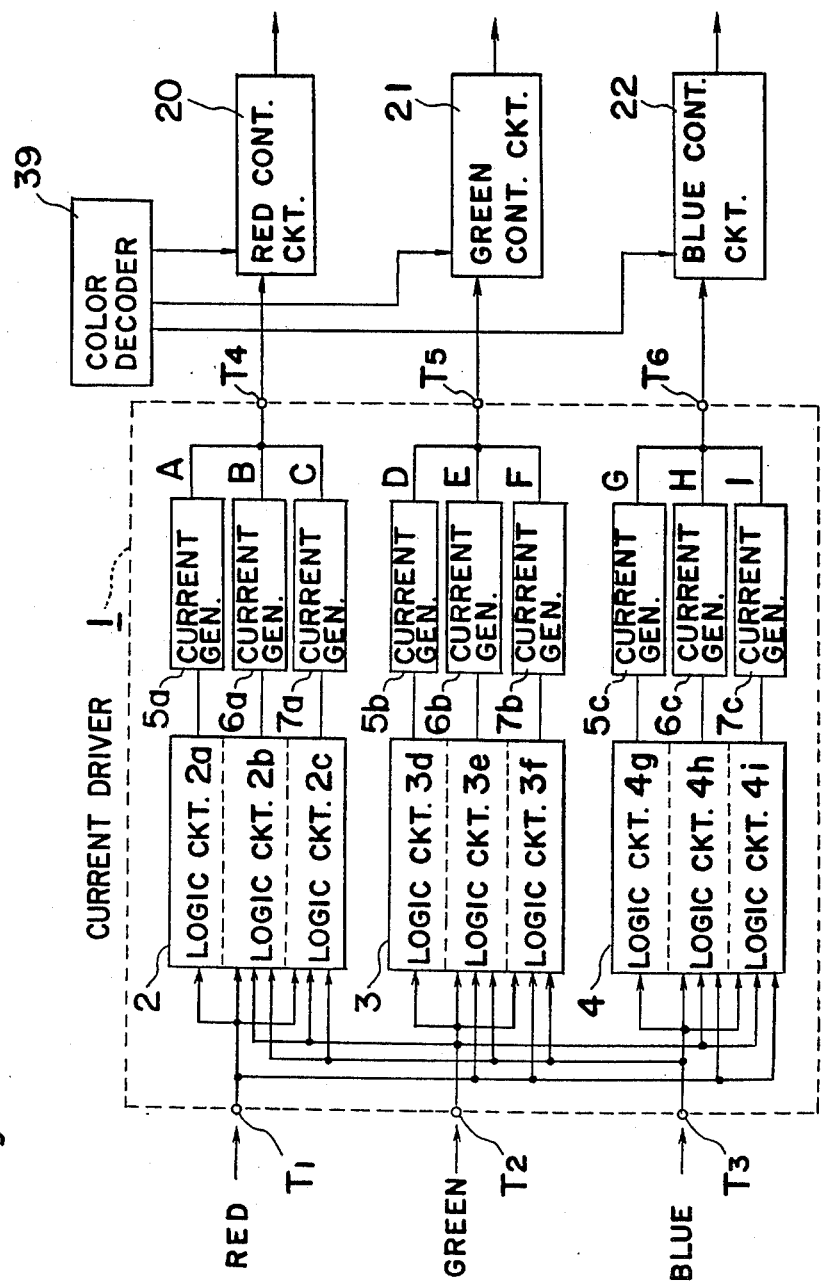
FIG. 1 is a block diagram of a current driver according to the present invention.

Before the description of the present invention proceeds, it is to be noted that like parts are designated by like reference numerals throughout the accompanying drawings.

First of all, the principle of generating the color driving current, according to the present invention, is described with reference to Table 2.

TABLE 2

| Color on the screen | Driving current | | | | | | | | | Total driving current |
|---|---|---|---|---|---|---|---|---|---|---|
| | Red | | | Green | | | Blue | | | |
| | A | B | C | D | E | F | G | H | I | |
| White | 2 | | | 2 | | | 2 | | | 6 |
| Red | 2 | 4 | | | | | | | | 6 |
| Green | | | | 2 | 4 | | | | | 6 |
| Blue | | | | | | | 2 | 4 | | 6 |
| Yellow | 2 | 1 | | 2 | 1 | | | | | 6 |
| Magenta | 2 | 1 | | | | | 2 | 1 | | 6 |
| Cyan | | | | 2 | 1 | | 2 | 1 | | 6 |

According to the present invention, each driving current is generated in three current components. More particularly, the red driving current is generated in three current components A, B and C in a current ratio of 2:1:4. Similarly, the green driving current is generated in three current components D, E and F in a current ratio of 2:1:4. Likewise, the blue driving current is generated in three current components G, H and I in a current ratio of 2:1:4. When white is to be established on a screen (not shown) of a television receiver (not shown), the components A, D and G are combined together. Since each of the components A, D and G carries current at the rate of 2, the total driving current for white is 6. On the other hand, when red is to be established on the screen, the components A and C are combined together. Since the components A and C carry current at the rate of 2 and 4, respectively, the total driving current for red is 6, that is, the same amount as that for the white.

Furthermore, when yellow is to be established on the screen, the components A, B, D and E are combined together. These components A, B, D and E carry current at the rate of 2, 1, 2 and 1, respectively. Accordingly, the total driving current for yellow also amounts to 6.

In general, the total driving current for all the seven colors amounts to an equal level of 6.

FIG. 1 shows a fundamental block diagram of a current driver 1 which includes input terminals T1, T2 and T3 for receiving signals indicative of the red driving current, green driving current and blue driving current, respectively. The current driver 1 further includes red logic circuit 2, green logic circuit 3 and blue logic circuit 4. The red logic circuit 2 includes three sub-logic circuits 2a, 2b and 2c each having one output terminal for producing a high or low level signal. The first logic circuit 2a produces a high level signal, when the terminal T1 receives the signal indicative of the red driving current, and produces a low level signal when the terminal T1 receives no signal indicative of the red driving current. The second logic circuit 2b produces a high level signal when the terminals T1 and T2 receive signals indicative of the red and green driving currents, respectively, or when the terminals T1 and T3 receive signals indicative of the red and blue driving currents, respectively. The third logic circuit 2c produces a high level signal when and only when the terminal T1 receives the signal indicative of the red driving current.

Similarly, the green logic circuit 3 includes three sub-logic circuits 3d, 3e and 3f each having one output terminal for producing a high or low level signal. The logic circuit 3d produces a high level signal, when the terminal T2 receives the signal indicative of the green driving current, and produces a low level signal when the terminal T1 receives no signal indicative of the green driving current. The logic circuit 3e produces a high level signal when the terminals T1 and T2 receive signals indicative of the red and green driving currents, respectively, or when the terminals T2 and T3 receive signals indicative of the green and blue driving currents, respectively. The logic circuit 3f produces a high level signal when only the terminal T2 receives the signal indicative of the green driving current.

Likewise, the blue logic circuit 4 has three sub-logic circuits 4g, 4h and 4i. The logic circuit 4g produces a high or low level signal when the terminal T3 receives or does not receive the signal indicative of the blue driving current, respectively. The logic circuit 4h produces a high level signal when the terminals T1 and T3 receive signals indicative of the red and blue driving currents, respectively, or when the terminals T2 and T3 receive signals indicative of the green and blue driving currents, respectively. The logic circuit 4i produces a high level signal when only the terminal T3 receives the signal indicative of the blue driving current.

FIG. 2 is a table showing presence and absence of the high level signal from the logic circuits 2a, 2b, 2c, 3d, 3e, 3f, 4g, 4h and 4i in response to the various combinations of the signals indicative of the red, green and blue driving currents. In FIG. 2, the first three columns from the left-hand side indicate the presence and absence of the signals indicative of the red, green and blue driving currents by the symbols "1" and "0", respectively, while the remaining columns indicate high and low level signals from the logic circuits by the symbols "1" and "0", respectively.

Referring back to FIG. 1, the logic circuits 2a, 2b and 2c are connected, respectively, to current generators 5a, 6a and 7a each being operable to generate current upon receipt of the high level signal from the corresponding logic circuit. In other words, if the logic circuit 2a produces a high level signal, current A is generated from the generator 5a. Similarly, currents B and C are generated from the generators 6a and 7a in response to the high level signals from the logic circuits 2b and 2c, respectively. According to the present embodiment, the current generator 5a generates a current of a level twice the current generated from the current generator 6a, while the current generator 7a generates a current of a level twice the current generated from the current generator 5a. In other words, the ratio of currents A:B:C from the current generators 5a, 6a and 7a is 2:1:4.

Current generators 5b, 6b and 7b which have the same structure as the generators 5a, 6a and 7a described above are also coupled to the logic circuits 3d, 3e and 3f for generating currents D, E and F, respectively. Accordingly, the ratio of currents D:E:F is 2:1:4.

Likewise, the current generators 5c, 6c and 7c of the same type as the generators 5a, 6a and 7a are coupled to the logic circuits 4g, 4h and 4i for generating currents G, H and I, respectively. Thus, the ratio of currents G:H:I is 2:1:4.

The outputs of the current generators 5a, 6a and 7a are connected to each other and, in turn, to an output terminal T4. Similarly, the outputs of the current generators 5b, 6b and 7b are connected to an output terminal T5 while the outputs of the current generators 5c, 6c and 7c are connected to an output terminal T6. The terminals T4, T5 and T6 are connected to red control circuit 20, green control circuit 21 and blue control circuit 22, respectively.

Figure 3:
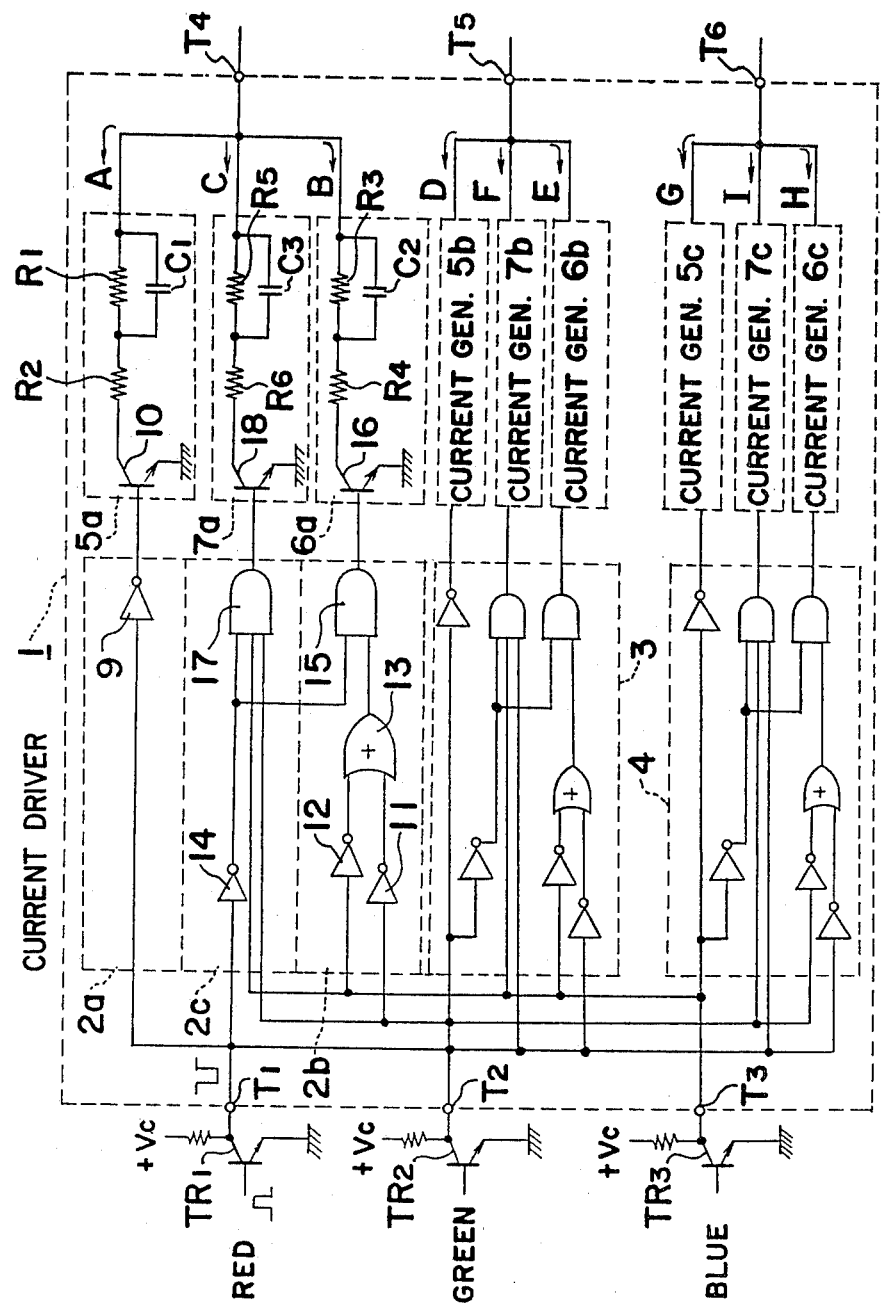
FIG. 3 is a circuit diagram of the current driver shown in FIG. 1.

FIG. 3 shows the details of the current driver 1 in which the input terminal T1 is connected to the collector of an emitter-grounded transistor TR1. The collector of the transistor TR1 is also connected to a source of electric power Vc through a suitable resistor for normally applying a high level signal to the input terminal T1. When the red driving current is applied to the base of the transistor TR1, the collector of the transistor TR1 is grounded for supplying negative-going pulse to the terminal T1. In a similar manner, the input terminals T2 and T3 are connected to the collectors of the emitter-grounded transistors TR2 and TR3, respectively. The collectors of these transistors TR2 and TR3 are also connected through suitable resistors to the source of electric power. When the green driving current is applied to the base of the transistor TR2, the terminal T2 is supplied with negative-going pulse and, when the blue driving current is applied to the base of the transistor TR3, the terminal T3 is supplied with negative-going pulse.

The first logic circuit 2a in the red logic circuit 2 includes an inverter 9 connected between the terminal T1 and the output of the first logic circuit 2a. The third logic circuit 2c positioned below the first logic circuit 2a includes an inverter 14 and an AND gate 17 having three inputs. The inverter 14 is connected between the terminal T1 and one input of the AND gate 17. The remaining two inputs of the AND gate 17 are connected to the terminals T2 and T3, respectively. The output of the AND gate 17 is the output of the third logic circuit 2c. The second logic circuit 2b includes inverters 11 and 12, EXCLUSIVE OR gate 13 having two inputs and AND gate 15 having two inputs. The inverter 11 is connected between the terminal T2 and one input of the EXCLUSIVE OR gate 13 while the inverter 12 is connected between the terminal T3 and the other input of the EXCLUSIVE OR gate 13. The output of the EXCLUSIVE OR gate 13 is connected to one input of the AND gate 15. The other input of the AND gate 15 is connected to the output of the inverter 14. The output of the AND gate 15 is the output of the second logic circuit 2b.

The current generator 5a includes a transistor 10 with its emitter grounded. The base of the transistor 10 is connected to the output of the first logic circuit 2a, that is, to the output of the inverter 9. The collector of the transistor 10 is connected to series-connected resistors R1 and R2 in which the resistor R1 is coupled in parallel to a capacitor C1. The end of the resistor R1 remote from the transistor 10 is connected to the output terminal T4 of the current driver 1.

The current generator 7a includes a transistor 18, resistors R5 and R6 and a capacitor C3 which are connected in the same manner as the current generator 5a. Similarly, the current generator 6a includes a transistor 16, resistors R3 and R4 and a capacitor C2 which are connected in the same manner as the current generator 5a.

For generating currents of different amount from the generators 5a, 6a and 7a, the resistors and capacitor are designed to have different values of the resistance and capacitance. For example, according to one embodiment, $C1=C2=C3=680pf$, $R1=270\Omega$, $R2=270\Omega$, $R3=560\Omega$, $R4=500\Omega$, $R5=150\Omega$, $R6=120\Omega$. In this arrangement, the current generator 5a generates, upon receipt of high level signal from the logic circuit 2a, red driving current A of 13 mA. Similarly, the current generator 6a generates, upon receipt of high level signal from the logic circuit 2b, red driving current B of 6.5 mA and, the current generator 7a generates, upon receipt of high level signal from the logic circuit 2c, red driving current C of 26 mA. The manner in which the red logic circuit 2 is operated to produce high level signals is described hereinbelow.

The first logic circuit 2a produces a high level signal when the input terminal T1 receives a negative-going pulse in response to the application of red driving current to the base of the transistor TR1.

The third logic circuit 2c produces a high level signal when the AND gate 17 is actuated, that is, when the input terminal T1 receives a negative-going pulse and, at the same time, the input terminals T2 and T3 receive positive pulses as a result of the presence of red driving current to the base of the transistor TR1 and the absence of green and blue driving currents to the base of the transistors TR2 and TR3.

The second logic circuit 2b produces a high level signal when the AND gate 15 is actuated, that is, when the input terminal T1 receives negative-going pulse and, at the same time, either one of the input terminals T2 and T3 receives negative-going pulse as a result of the presence of red driving current and the presence of either green or blue driving current.

In the above described manner, the first, second and third logic circuits 2a, 2b and 2c produce high level signal as listed in FIG. 2.

The green logic circuit 3 and the blue logic circuit 4 have the same structure as the red logic circuit 2 and, therefore, they operate in a manner similar to the red logic circuit 2. Accordingly, a further description thereof is omitted for the sake of brevity.

Figure 4:
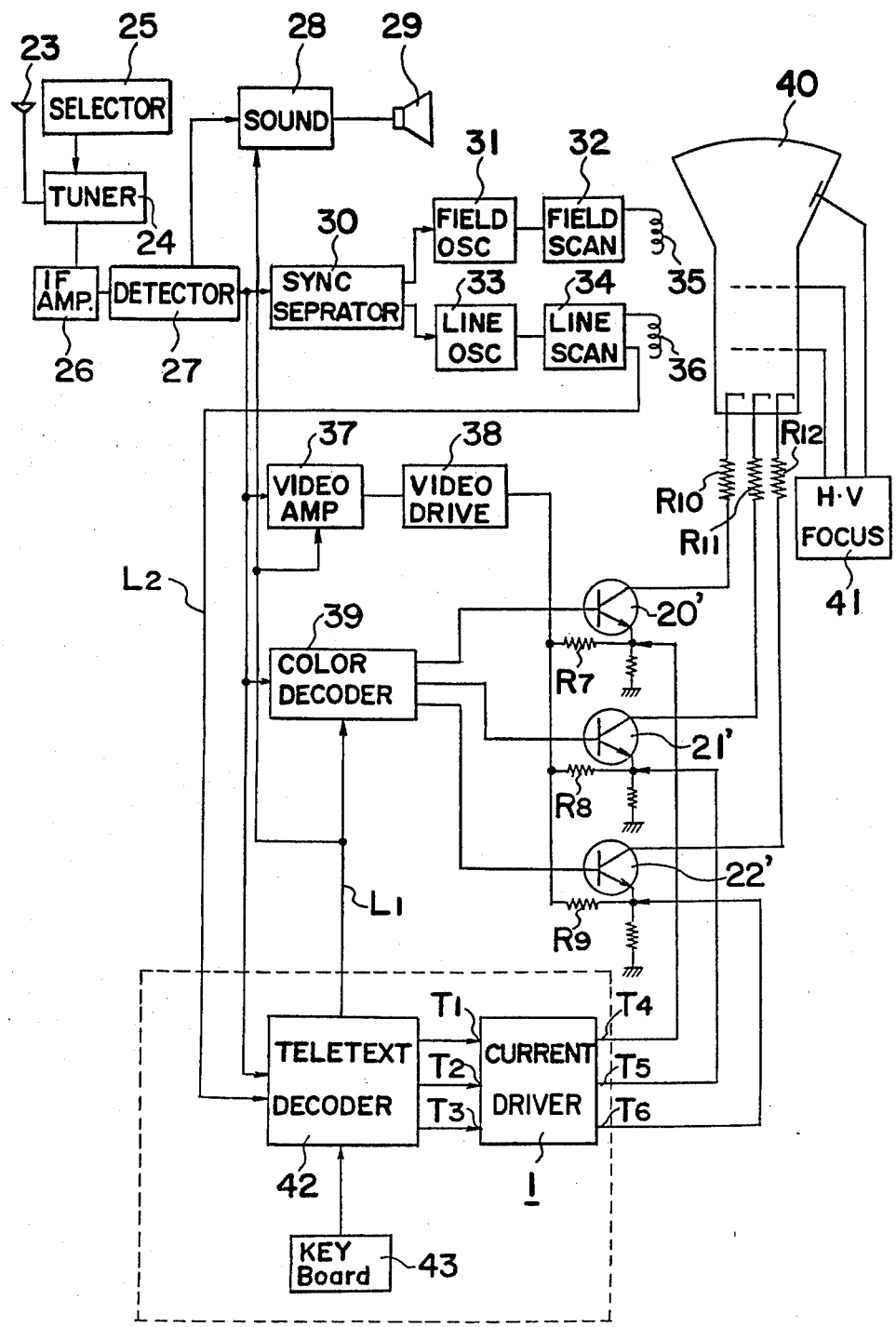
FIG. 4 is a block diagram of a television receiver employing the current driver.

FIG. 4 shows one example of a color television receiver in block diagram employing the current driver 1 of the present invention. This color television receiver is capable of not only reproducing the normal television but also displaying the decoded pages of text through the teletext system. An electric wave received by an antenna 23 is applied to a tuner 24 which is controlled by a selector 25. In the tuner 24, broadcasted signal of a particular channel is synchronized to enable it to be transmitted to an intermediate frequency (IF) amplifier 26. The IF amplifier 26 amplifies sound intermediate frequency (SIF) signal and video intermediate frequency (VIF) signal and applies those signals SIF and VIF to a detector 27. The SIF signal is converted into an intercarrier signal in the detector 27 and is transmitted to a sound circuit 28 for producing sound through a loud speaker 29. The video signal as detected from the VIF signal in the detector 27 is applied to a synchronizing circuit 30, a video amplifier 37 and a color decoder 39. The synchronizing separator 30 separates vertical synchronizing signal and horizontal synchronizing signal from the video signal. The separated vertical synchronizing signal is applied to a field oscillator 31 and, in turn, to a field scan control 32 for the vertical deflection by the use of a coil 35. On the other hand, the separated horizontal synchronizing signal is applied to a line oscillator 33 and, in turn, to a line scan control 34 for the horizontal deflection by the use of a coil 36.

The video signal applied to the video amplifier 37 is transmitted to a video driving circuit 38. The signal produced from the video driving circuit 38 is applied through resistors R7, R8 and R9 to the emitters of transistors 20', 21' and 22' respectively. These transistors 20', 21' and 22' constitute red control circuit 20, green control circuit 21 and blue control circuit 22, respectively.

The video signal applied to the color decoder 39 is used for producing three color difference signals which are applied to the bases of the transistors 20', 21' and 22', respectively. Therefore, each collector of the transistors 20', 21' and 22' produces a combined signal of the signal from the video driving circuit 38 and the color difference signal from the color decoder 39. Such combined signal, namely, original color signal, is applied to a cathode terminal of a cathode-ray tube 40 through a respective resistors R10, R11 or R12. The cathode-ray tube 40 is coupled with a high voltage and focusing circuit 41 for providing high voltage to the cathode-ray tube 40 and for focusing the image on the screen of the cathode-ray tube 40. The network of the television receiver and its function as described above are for the common color television broadcasting.

The description hereinbelow is directed to the display of decoded Pages in place of the television picture. The teletext Character Rows constituting the Page are, according to BBC's CEEFAX service, carried on unused lines 17, 18, 330 and 331 of the television field-blanking interval. These unused lines are directed from the detector 27 to a teletext decoder 42 which is coupled with a keyboard 43. When the keyboard 43 is so operated as to actuate the teletext decoder 42, a blanking signal is transmitted from the teletext decoder 42 to the sound circuit 28, video amplifier 37 and color decoder 39 through a mute line L1 for disabling these circuits 28, 37 and 39. The teletext decoder 42 is also connected to the line scan control 34 through a line L2 for receiving fly-back pulse which is used for taking out the teletext signal from the video signal.

It is to be noted that when the keyboard 43 is so actuated as to disable the teletext decoder 42, the mute line L1 transmits no blanking signal. Therefore, the television receiver operates as to reproduce the color video signal in the usual manner.

The teletext decoder 42 produces three color information signals which are red driving current, green driving current and blue driving current. These three color information signals are applied to the input terminals T1, T2 and T3 of the current driver 1 described above. The output terminals T4, T5 and T6 of the current driver 1 are connected to the emitters of the output transistors 20', 21' and 22'. Each of the transistors 20', 21' and 22' is connected to a source of electric power (not shown) for supplying d.c. biasing current. The signal from the current driver 1, which defines the emitter current of each of the transistors 20', 21' and 22' controls the collector curent thereof. Accordingly, the teletext characters of all the seven colors have the same brightness with each other and also with the background.

Although the present invention has been fully described by way of examples with reference to the accompanying drawings, it is to be noted that various changes and modifications are apparent to those skilled in the art. Therefore, such changes and modifications depart from the true scope of the present invention, they should be construed as included therein.

What is claimed is:

1. A color television receiver having red, green and blue control circuits for applying red, green and blue currents to respective color guns of a cathode-ray tube in accordance with a received signal to render the respective brightness of the colors established on a screen of the cathode-ray tube to be equal to each other, said color television receiver including a decoder for producing red, green and blue color signals in the form of bilevel signals in accordance with the received signal, and a current driver means having at least three inputs for receiving the bilevel signals, said current driver means comprising a logic circuit means coupled to said inputs for receiving said bilevel signals from said decoder and for providing bilevel color driving signals in accordance with the received bilevel signals and current generator means coupled to said logic circuit means for receiving the output thereof and for generating a color driving current for each color gun in accordance therewith wherein each driving current is formed of a selected one of or combination of plural current components having different current levels.

2. A color television receiver as claimed in claim 1, wherein said plural current components comprise three current components having current levels in a ratio of 4:2:1.

3. A color television receiver as claimed in claim 2, wherein said logic circuit means comprises: a red logic circuit having first, second and third output terminals, said first output terminal producing a high level signal when the red color signal is present, said second output terminal producing a high level signal when red and green or red and blue color signals are present and said third output terminal producing a high level signal when only red color signal is present; green logic circuit having fourth, fifth and sixth output terminals, said fourth output terminal producing a high level signal when the green color signal is present, said fifth output terminal producing a high level signal when green and red or green and blue color signals are present and said sixth output terminal producing a high level signal when only green color signal is present; blue logic circuit having seventh, eighth and ninth output terminals, said seventh output terminal producing a high level signal when the blue color signal is present, said eighth output terminal producing a high level signal when blue and red or blue and green color signals are present and said ninth output terminal producing a high level signal when only blue color signal is present; and wherein said drive current generator means comprises first current generator for generating a first current upon receipt of the high level signal from the first output terminal; second current generator for generating a second current upon receipt of the high level signal from the second output terminal, said second current being a half the level of the first current; third current generator for generating a third current upon receipt of the high level signal from the third output terminal, said third current being of a level twice the level of the first current; fourth current generator for generating a fourth current upon receipt of the high level signal from the fourth terminal, said fourth current having the same level as the first current; fifth current generator for generating a fifth current upon receipt of the high level signal from the fifth terminal, said fifth current having the same level as the second current; sixth current generator for generating a sixth current upon receipt of the high level signal from the sixth terminal, said sixth current having the same level as the third current; seventh current generator for generating a seventh current upon receipt of the high level signal from the seventh terminal, said seventh current having the same level as the first current; eighth current generator for generating an eighth current upon receipt of the high level signal from the eighth terminal, said eighth current having the same level as the second current; ninth current generator for generating a ninth current upon receipt of the high level signal from the ninth terminal, said ninth current having the same level as the third current; a first output port for receiving currents from the first, second and third current generators and supplying a composite driving current to the red control circuit; a second output port for receiving currents from the fourth, fifth and sixth current generators and supplying a composite driving current to the green control circuit; and a third output port for receiving currents from the seventh, eighth and ninth current generators and supplying a composite driving current to the blue control circuit.

4. A current driver circuit for use with a color cathode-ray tube, having at least three inputs for receiving the bilevel signals, said current driver circuit comprising logic circuit means coupled to said inputs for receiving said bilevel signals and for providing bilevel color driving signals in accordance with the received bilevel signals and current generator means coupled to said logic circuit means for receiving the output thereof and for generating red, green and blue driving currents in accordance therewith wherein each of the driving currents is formed of a selected one of or combination of plural current components having different current levels.

5. A color driver circuit as claimed in claim 4, wherein each of the driving current for said plural current components comprise three current components having current levels in a ratio of 4:2:1.

6. A color driver circuit as claimed in claim 5, wherein said logic circuit means comprises: a red logic circuit having first, second and third output terminals, said first output terminal producing a high level signal when the red color signal is present, said second output terminal producing a high level signal when red and green or red and blue color signals are present and said third output terminal producing a high level signal when only red color signal is present; green logic circuit having fourth, fifth and sixth output terminals, said fourth output terminal producing a high level signal when the green color signal is present, said fifth output terminal producing a high level signal when green and red or green and blue color signals are present and said sixth output terminal producing a high level signal when only green color signal is present; blue logic circuit having seventh, eighth and ninth output terminals, said seventh output terminal producing a high level signal when the blue color signal is present, said eighth output terminal producing a high level signal when blue and red or blue and green color signals are present and said ninth output terminal producing a high level signal when only blue color signal is present; and wherein said drive current generator means comprises first current generator for generating a first current upon receipt of the high level signal from the first output terminal; second current generator for generating a second current upon receipt of the high level signal from the second output terminal, said second current being a half the level of the first current; third current generator for generating a third current upon receipt of the high level signal from the third output terminal, said third current being of a level twice the level of the first current; fourth current generator for generating a fourth current upon receipt of the high level signal from the fourth terminal, said fourth current having the same level as the first current; fifth current generator for generating a fifth current upon receipt of the high level signal from the fifth terminal, said fifth current having the same level as the second current; sixth current generator for generating a sixth current upon receipt of the high level signal from the sixth terminal, said sixth current having the same level as the third current; seventh current generator for generating a seventh current upon receipt of the high level signal from the seventh terminal, said seventh current having the same level as the first current; eighth current generator for generating an eighth current upon receipt of the high level signal from the eighth terminal, said eighth current having the same level as the second current; ninth current generator for generating a ninth current upon receipt of the high level signal from the ninth terminal, said ninth current having the same level as the third current; a first output port for receiving currents from the first, second and third current generators and supplying a composite red driving current; a second output port for receiving currents from the fourth, fifth and sixth current generators and supplying a composite green driving current; and a third output port for receiving currents from the seventh, eighth and ninth current generators and supplying a blue composite driving current.

* * * * *